United States Patent [19]

Brouwer

[11] Patent Number: 4,806,414
[45] Date of Patent: Feb. 21, 1989

[54] COMPOSITE MATERIAL
[75] Inventor: Anton H. J. Brouwer, Oosterbeek, Netherlands
[73] Assignee: Akzo nv, Arnhem, Netherlands
[21] Appl. No.: 902,650
[22] Filed: Sep. 2, 1986
[30] Foreign Application Priority Data Sep. 4, 1985 [NL] Netherlands ........................ 8502418

[51] Int. Cl.$^4$ ........................ B32B 27/04; B32B 27/12
[52] U.S. Cl. ................................... 428/260; 428/261; 428/290; 428/423.7; 428/480
[58] Field of Search ................ 528/84, 301; 525/109; 428/423.7, 480, 290, 260, 261; 427/385.5

[56] References Cited

U.S. PATENT DOCUMENTS

| 3,763,109 | 10/1973 | Witsiepe | 528/301 |
| 3,775,150 | 11/1973 | McClary | 525/109 |
| 3,945,876 | 3/1976 | Bianca | 428/423.7 X |
| 4,483,970 | 11/1984 | Huntjens et al. | 528/84 X |

FOREIGN PATENT DOCUMENTS

| 1186431 | 4/1970 | United Kingdom | 427/385.5 |
| 1224051 | 3/1971 | United Kingdom | 427/385.5 |

Primary Examiner—Thomas J. Herbert
Attorney, Agent, or Firm—Stevens, Davis, Miller & Mosher

[57] ABSTRACT

Composite consisting of a thermoplastic or thermosetting polymer or a vulcanized or non-vulcanized rubber containing yarns, cords and/or fabrics provided with a polyester-ester urethane as adhesive and which polyester-ester urethane contains 30 to 80% by weight of blocks of ester units of a high-melting polyester and 70 to 20% by weight of blocks of ester units of a low-melting polyester which are linked together through ester groups and/or urethane groups. The melting-point of the polyester-ester urethane is at least 160° C. and the melting-point of the low-melting polyester is not higher than 100° C.

6 Claims, No Drawings

COMPOSITE MATERIAL

The invention relates to a composite consisting of a thermoplastic or thermosetting polymer or a vulcanized or non-vulcanized rubber containing yarns, cords and/or fabrics provided with an adhesive.

Polymeric or rubber composites in which yarns, cords and/or fabrics of synthetic polymers or regenerated cellulose are incorporated are well known. The strength and also several other physical properties of such composites have been found to be greatly improved over those of polymers or rubber in which no reinforcing materials are incorporated.

It is further known that no full justice is done to these improved properties unless there is a strong bond between the reinforcing material and the polymers or rubber in which this material is incorporated.

Many solutions have been proposed particularly for the improvement of adhesion to rubber of yarns, cords and/or fabrics of synthetic polymers such as polyethylene terephthalate, polyamide 6 or 66 and aromatic polyamide. They generally consist of a first treatment of the yarn with compounds having reactive groups, followed by a second treatment with a dip based on resorcinol, formaldehyde and latex (RFL).

For the adhesion to a thermoplastic elastomer, such as copolyetherester, of synthetic yarns of, for instance, polyethylene terephthalate (PETP) U.S. Pat. No. 3,945,876 proposes subjecting the yarn and/or the copolyetherester to a pretreatment with a prepolymer containing at least 2% of isocyanate groups. U.S. Pat. No. 3,775,150 proposes that prior to the treatment with an RFL dip to enhance the adhesion to rubber the PETP yarns should be treated with an uncured epoxy resin.

A disadvantage to the above discussed adhesive compositions is the risk of the high reactivity of these compositions being injurious to people that come into contact with them. Moreover, in several cases the level of adhesion appears still to be unsatisfactory.

The above problems are entirely or largely overcome by the present invention, which provides a composite consisting of thermoplastic or thermosetting polymer or a vulcanized or non-vulcanized rubber containing yarns, cords and/or fabrics provided with an adhesive. The invention consists in that with a composite having the known composition mentioned in the opening paragraph the adhesive is a polyester-ester urethane built up of polyester-ester units which are linked together by low molecular weight structural units of the formula

wherein $R_1$ represents a polyfunctional organic group having not more than 30 carbon atoms, and p is an integer of 2 or 3, which polyester units are composed of two types of polyester-ester units which are each built up of blocks comprising (1) a multiple of ester units of the formula

(2) a multiple of other ester units which may form a bifunctional polyester or polyester amide having a melting point not higher than 100° C., which two types of polyester units are linked together by ester bonds, with the proviso that at least 80 mole % of the G groups in the latter formula are tetramethylene groups and the remaining proportion thereof consists of divalent groups left after removal of hydroxyl groups from a low molecular weight diol having a molecular weight not higher than 250; at least 80 mole % of the $R_2$ groups are 1,4-phenylene groups and the remaining proportion thereof consists of divalent radicals left after removal of carboxyl groups from a low molecular weight dicarboxylic acid having a molecular weight not higher than 300; the sum of the percentages of G groups which are not tetramethylene groups and the percentages of $R_2$ groups which are not 1,4-phenylene groups does not exceed 20; the ester units of the formula

form 30 to 80% by weight of the polyester-ester, and that blocks of ester units of the formula

and the blocks of the other ester units are present in amounts such that the melting point of the polyester-ester urethane is at least 160° C.

It should be noted that as far as composition is concerned part of the adhesives to be used in the present composition corresponds to part of the thermoplastic elastomers described in U.S. Pat. No. 4,483,970. Not the slightest suggestion is made in it that part of the thermoplastic elastomers described in it, which are said to be excellently suitable to be injection moulded or extruded into shaped articles, could be used surprisingly successfully in composites for the purpose of enhancing the adhesion of yarns, cords and/or fabrics to the matrix material employed.

According to the invention the matrix of the composite may consist of a thermosetting or a thermoplastic synthetic material. As examples of suitable thermosetting synthetic materials for use within the scope of the present invention may be mentioned epoxy resins, unsaturated polyester resins and phenol formaldehyde resins.

Examples of suitable thermoplastic synthetic materials include:
polyethylene terephthalate and polybutylene terephthalate (PETP and PBTP),
polyether-ether ketone (PEEK),
polyether sulphone (PES),
polyester imide (PEI),
polyimide (PI),
polyhexamethylene adipamide (nylon 66),
poly-ε-caprolactam (Nylon 6),
poly-ε-dodecanecarboxylic acid (Nylon 12), or
polycarbonate (PC), Also may be mentioned the thermoplastic elastomers as described in U.S. Pat. Nos. 3,023,192 and 3,763,109 and the polyester-ester urethanes according to U.S. Pat. No. 4,483,970. When use is made of the polyester-ester urethanes according to the last-mentioned patent specification, there is no need to employ a separate adhesive.

By a vulcanized or non-vulcanized rubber is to be understood both a synthetic and a natural rubber. As examples of synthetic rubbers may be mentioned polybutadiene, polyisoprene, polybutadiene-styrene, polybutadiene acrylonitrile, polyisobutylene and polyacrylonitrile butadiene-styrene (ABS) rubber. Other synthetic rubbers are the polyether urethanes, the polyester urethanes and the copolyetheresters.

Into all the afore-mentioned thermosetting or thermoplastic synthetic materials and rubbers there may also be incorporated fillers known in themselves.

The yarn and/or cords used for reinforcing the present composites are generally in the form of a fabric. However, they also may be used in the form of a knitted fabric, a braid or a non-woven fabric. A favourable embodiment consists in that a number of substantially parallel yarns are formed into a reinforcing layer with the adhesive according to the invention. In this way a for instance 2 to 5 cm wide unidirectional tape or U.D. tape may be obtained which may be used for making shaped objects by the winding technique known in itself, with the matrix material being placed between the layers of reinforcing tape. U.D. tapes may be made to a width of up to 60 cm. These are applied in the hand lay up art, i.e. building composites by hand.

The yarns, cords and/or fabrics that form part of the composites according to the present invention may be made from the most widely varying materials. These include metal and carbon and inorganic and organic synthetic materials. In view of satisfactory adhesion, however, it is preferred that use shohld be made of yarns of synthetic materials based on organic polymers such as polyethylene terephthalate (PETP), polycaprolactam, nylon 66, and particularly aromatic polyamide.

Aromatic polyamides are polyamides that consist entirely or substantially of recurring units of the general formula

and/or

wherein $A_1$, $A_2$ and $A_3$ represent the same or different divalent, one or more aromatic rings containing-rigid radicals, which may also contain a heterocyclic ring, of which radicals the chain extending bonds are in the para position to each other or are parallel and oppositely directed. Examples of these radicals include 1,4-phenylene, 4,4'-biphenylene, 1,5-naphthalene and 2,6-naphthalene.

They may contain substituents or not, e.g. halogen atoms or alkyl groups. In addition to amide groups and the above-mentioned aromatic radicals the chain molecules of the aromatic polyamides may optionally contain up to 50 mole % of other groups, such as m-phenylene groups, non-rigid groups, such as alkyl groups, or ether, urea or ester groups such as 3,4'-diaminodiphenyl ether groups. By preference the yarn according to the invention entirely or substantially consists of poly-p-phenylene terephthalamide.

Composite materials having optimum properties are obtained if according to the invention use is made of aromatic polyamide yarns having a modulus of elasticity of 60 to 140 GPa, an elongation at rupture of 2-4,5%, and a tensile strength of 2,5 to 3,5 GPa. The modulus of elasticity, the elongation at rupture and the tensile strngth are measured in accordance with ASTM-D885.

It has been found that an adhesive having satisfactory properties is generally obtained when the proportion of low-molecular weight structural units of the formula

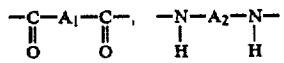

calculated as diphenylmethane-4,4'-diisocyanate (MDI) and based on the polyester-ester urethane is in the range of 0,5 to 12,5% by weight. Preference is given to an adhesive in which the proportion of low-molecular weight structural units of the formula

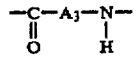

is in the range of 1 to 10% by weight.

At least 80 mole % of the low molecular weight diol and at least 80 mole % of the low molecular weight dicarboxylic acid from which the ester units of the formula

and derived is formed respectively of 1,4-butanediol and terephthalic acid.

Included among suitable diols (other than 1,4-butanediol) having a molecular weight not exceeding 250 are acylic, alicyclic and aromatic dihydroxy compounds. Preferred are diols with 2-15, and particularly 5-10 carbon atoms such as ethylene, propylene, isobutylene, pentamethylene, 2,2-dimethyltrimethylene, hexamethylene, and decamethylene glycol, dihydroxy cyclohexane, dimethanol cyclohexane, resorcinol, hydroquinone and 1,5-dihydroxy naphthalene. Especially preferred are aliphatic diols containing 2-8 carbon atoms. Included among the bis-phenols which can be used are bis(p-hydroxy)diphenyl, bis(p-hydroxyphenyl)methane and bis(p-hydroxyphenyl)propane.

Suitable dicarboxylic acids (other than terephthalic acid) having a molecular weight not exceeding 300 are aliphatic, cycloaliphatic or aromatic dicarboxylic acids. The term aliphatic dicarboxylic acids as used in the description of the invention refers to carboxylic acids having two carboxyl groups which are each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids as maleic acid, can be used. Aromatic dicarboxylic acids, as the term is used herein, are diarboxylic acids having two carboxyl groups attached to carbon atoms in an isolated or fused benzene ring. It is not necessary that both functional carboxyl groups be attached to the same aromatic ring and where more than one ring is present, they can be joined by aliphatic or aromatic divalent radicals such as —O— or —SO$_2$—. Representative aliphatic and cycloaliphatic acids which can be used for this invention are sebacic acid, 1,3-cyclohexane dicarboxylic acid, 1,4-cyclohexane dicarboxylic acid, adipic acid, glutaric acid, succinic acid, carbonic acid, oxalic acid, azelaic acid, diethyl-malonic acid, allylmalonic acid, 4-cyclohexene-1,2-dicarboxylic acid, α,α'-β,β'-tetramethylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4'-methylene-bis-(cyclohexane carboxylic acid), 3,4-furan dicarboxylic acid and 1,1-cyclobutane dicarboxylic acid. Preferred aliphatic and cycloaliphatic acids are cyclohexane-dicarboxylic acids and adipic acid.

Representative aromatic dicarboxylic acids which can be used include phthalic and isophthalic acids, bibenzoic acids, substituted dicarboxy compounds with two benzene nuclei such as bis(p-carboxyphenyl)ethane, p-oxy(p-carboxyphenyl)benzoic acid, ethylenebis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and $C_1$–$C_{14}$ alkyl and/or ring substitution derivatives thereof, such as halo, alkoxy and aryl derivatives. Hydroxyl acids such as p(β-hydroxyethoxy)benzoic acid can also be used, providing an aromatic dicarboxylic acid is also present. Aromatic dicarboxylic acids are a preferred class for preparing the ester units of the formula:

Among the aromatic acids, those with 8–16 carbon atoms are preferred, particularly the phenylene dicarboxylic acids, i.e., phthalic and isophthalic acids.

In view of the melting point and the relatively high crystallization or curing rate of the polyester-ester urethane it is preferred that the ester units of the formula

should entirely or substantially be derived from polybutylene terephthalate. The procedure for preparing the low melting polyesters or polyester amides is known per se and similar to that used for preparing high melting polyesters. It may be realized for instance by polycondensation of polyfunctional, preferably bifunctional alcohols, amino alcohols, hydroxycarboxylic acids, lactones, aminocarboxylic acids, cyclic carbonates or polycarboxylic acids. By a proper choice of the mixing ratio of the above-mentioned components any desirable molecular weight and number and type of terminal groups may be obtained.

As examples may be mentioned polyesters from adipic acid and ethylene glycol, butanediol, pentanediol, hexanediol, mixtures of ethylene glycol and propylene glycol, hexanediol and methylhexanediol, hexanediol and 2,2-dimethyl-1,3-propanediol, hexanediol, butanediol or pentanediol or polyester amides from hexanediol and piperazine. Also other glycols, such as 1,3- or 1,4-cyclohexanediol or 1,3- or 1,4-bis(hydroxymethyl)cyclohexane, amino alcohols such as amino ethanol or amino propanol may be incorporated into the low melting components. The low melting components also may entirely or partly be composed of lactones such as substituted or unsubstituted caprolactone or butyrolactone. Under some circumstances, for instance to increase the melt viscosity of the endproduct, it may be recommended to incorporate some small amount of higher functional compounds. As examples of such compounds may be mentioned trimethylol ethane, trimethylol propane or hexane triol. The low melting bifunctional components may also be derived from the following acids: glutaric acid, pimelic acid, suberic acid, isosebacic acid or ricinoleic acid. Also aliphatic dicarboxylic acids having hetero atoms, such as thiodipropionic acid may be used in the low melting bifunctional compounds. In addition there still may be mentioned cycloaliphatic dicarboxylic acids such as 1,3- or 1,4-cyclohexane dicarboxylic acid and terephthalic acid and isophthalic acid. For an essentially better resistance to hydrolysis preference is given to polyesters of which the constituents each consist of at least 5 carbon atoms. As examples may be mentioned adipic acid and 2,2-dimethyl propanediol or mixtures of 1,6-hexanediol and 2,2-dimethyl propanediol or 2-methyl-1,6-hexanediol. In addition to the low melting polyesters or polyester amides some other low melting bifunctional compounds may to a limited extent be incorporated into the segmented thermoplastic elastomers according to the invention. As examples may be mentioned polyalkylene glycol ethers having terminal hydroxyl groups as obtained by reaction with water, diamines, di- or trifunctional alcohols or amino alcohols. Special mention is made here of polytetrahydrofuran obtained by polymerization of tetrahydrofuran in the presence of acid catalysts or copolymers thereof with small amounts of ethylene oxide and/or propylene oxide. Both in view of its being readily obtainable and of other properties of the final elastomer preference is given to a polyester-ester urethane whose ester units that may form a bifunctional polyester or polyester amide having a melting point not higher than 100° C. are entirely or substantially derived from polybutylene adipate. An adhesive having very good properties is also obtained when the ester units that may form a bifunctional polyester or polyester amide having a melting point not higher than 100° C. are entirely or substantially derived from polycaprolactone. The low molecular weight structural units of the formula

which may be used according to the invention are derived from di- and triisocyanates. The diisocyanates may be represented by the general formula OCNR-NCO, wherein R represents a divalent, aliphatic, alicyclic or aromatic group.

Examples of suitable diisocyanates of the aliphatic type are: hexamethylene diisocyanate, dimethyl hexamethylene diisocyanate, trimethyl hexamethylene diisocyanate, metaxylylene diisocyanate, paraxylylene diisocyanate, tetramethylene diisocyanate. When R represents an aromatic group, it may be substituted for instance with a halogen, a lower alkyl or a lower alkoxy group. Examples of these diisocyanates include: 1-chloro-2,4-phenylene diisocyanate, 2,4-toluene diisocyanate, a mixture of 2,4-toluene and 2,6-toluene diisocyanate, tetramethylphenylene diisocyanate, diphenylmethane-4,4'-diisocyanate, metaphenylene diisocyanate, paraphenylene diisocyanate, naphthalene-1,5-diisocyanate, diphenyl-4,4′-diisocyanate, biphenylmethane-4,4′-diisocyanate, diphenyldimethylmethane-4,4′-diisocyanate, benzophenone-4,4′-diisocyanate, biphenylether diisocyanate and biphenylsulphide diisocyanate, 3,3′-dimethyldiphenyl-4,4′-diisocyanate, 3,3′-dimethoxydiphenyl-4,4′-diisocyanate, 3,3′-dichlorodiphenyl-4,4′-diisocyanate, benzofuran-2,7-diisocyanate. Examples of diisocyanates having an alicyclic group include isophoron diisocyanate, dicyclohexylmethane diisocyanate and 1,4-cyclohexane diisocyanate. It has been found that optimum properties are generally obtained if the ratio of the number of —NCO groups of the diisocyanate to the number of functional groups of the block polyester-esters is in the range of 1,1 to 1,5. Both with a view to the properties of the end product and simplicity of preparation preference is given according to the invention to polyester-esters having hydroxyl end groups.

The invention also relates to processes for the preparation of a polyester-ester urethane of the composition mentioned hereinbefore to be used as adhesive.

One of these processes is characterized in that a bifunctional polyester having a molecular weight of at least 1000 and built up of ester units of the formula

wherein both G and $R_2$ have the same meaning as indicated before, is reacted, while in the molten phase, with a bifunctional polyester or polyester amide having a molecular weight of at least 1500 and a melting point not higher than 100° C., after which the resuting polyester-ester is reacted with a low molecular weight coupling agent of the formula $R_1[NCO]_p$ wherein $R_1$ and p have the afore-indicated meaning, in an amount such that the ratio of the number of —NCO groups to the number of functional groups of the polyester-ester is at least 1,0 and not higher than 5, the transesterification catalyst present in one or in both polyesters or polyesteramides being entirely or partly deactivated before and/or during the preparation of the polyester-ester.

When use is made of a mixture of polyesters or polyester amides having a hydroxyl number of 40 or higher the transesterification catalyst will have to be deactivated almost entirely in order to obtain a polyester-ester urethane according to the invention.

On the other hand, if the preparation is started from a mixture of polyesters or polyester amides having a lower hydroxyl number, particularly if use is made of starting products having a relatively high molecular weight, then partial deactivation will within a particular space of time lead to optimally transesterified block polyester-ester. At a given weight ratio of polyesters having a particular molecular weight (hydroxyl number) it will not be difficult for a man skilled in the art to choose the most favourable conditions which lead to a copolyester-ester urethane having optimum properties as adhesive in composites. The present process is advantageously started from a low-melting bifunctional polyester or polyester amide having a molecular weight of 1500 to 2500 and a high-melting polyester of the formula

having a molecular weight in the range of 10,000 to 25,000. Preference is given then to the use of a high-melting polyester which entirely or substantially consists of polybutylene terephthalate having a molecular weight in the range of 15,000 to 19,000. When, however, use is made of a high-melting polyester having a molecular weight in the range of 1500 to 3000, preference is given to its use in combination with a low-melting polyester or polyester amide having a molecular weight in the range of 10,000 to 20,000. For the purpose of transesterification in the preparation of the polyester use is generally made of a titanium catalyst or a calcium salt, a manganese salt and/or a zinc salt. These salts may be deactivated by adding precipitating or complexing agents. Deactivation also may be carried out by applying a thermal treatment. It has been found, for instance, that when the catalyst used is zinc acetate, it may be deactivated by heating to a temperature of at least 200° C. Favourable results are particularly found to be obtained when use is made of complexing phosphorus compounds, which are also suitable to be used as stabilizers in polyesters. In this connection reference is made to the phosphites and thiophosphites which are described in U.S. Pat. No. 3,039,993, and to the phosphates, phosphonates, phosphonic acids and phosphinic acids of the following structural formulae:

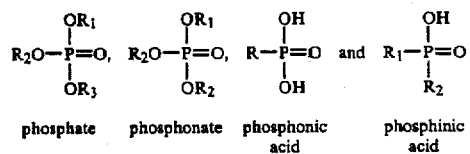

phosphate    phosphonate    phosphonic acid    phosphinic acid wherein R, $R_1$, $R_2$ and $R_3$ may be the same or different and represent a hydrogen atom or a substituted or unsubstituted organic group. Examples of suitable substituents are a lower alkyl group, cycloalkyl group, alkoxy group, cycloalkoxy group, hydroxyl group and/or a halogen atom. If R, $R_1$, $R_2$ and $R_3$ represent an organic group they generally do not contain more than 30, and preferably not more than 18 carbon atoms. As examples may be mentioned alkyl, cycloalkyl, carboalkoxy alkyl, aryl, aralkyl and aroxy alkyl. As examples of phosphorus compounds that are excellently suitable to be used for the present purpose may be mentioned: triphenyl phosphate, triphenyl phosphite, triethyl phosphite, tricyclohexyl phosphite, tri-2-ethylhexyl trithiophosphite, trieicosyl phosphite, tri-o-chlorophenyl phosphite, 2-carbomethoxyethyl dimethyl phosphonate, hydroxymethyl phosphonic acid, diphenyl phosphinic acid, carboxymethyl phosphonic acid, carbethoxymethyl phosphonic acid, carboxyethyl phosphonic acid, tris(triethylene glycol)phosphate and more particularly carbethoxymethyl diethyl phosphonate and tri-p-tert. butylphenyl phosphite. Favourable results are also obtained by using phosphorus compounds of the formula

wherein $R_1$ and $R_2$ may be the same or different and represent a hydrogen atom or an alkyl, cycloalkyl, aralkyl or aryl group each having not more than 20 carbon atoms, or the group $OR_3$, wherein $R_3$ represents a metal or ammonium or the same group or the same atom as $R_1$, irrespective of the meaning of $R_1$.

Examples of suitable phosphorus compounds include the inorganic acids such as orthophosphoric acid, phosphorous acid or hypophosphorous acid; phosphinic acid such as methyl phosphonic acid, ethyl phosphinic acid, isobutyl phosphinic acid, benzyl phosphinic acid, phenyl phosphinic acid, cyclohexyl phosphinic acid or 4-methylphenyl phosphinic acid; phosphonic acids such as methyl phosphonic acid, ethyl phosphonic acid, isopropyl phosphonic acid, isobutyl phosphonic acid, benzyl phosphonic acid, phenyl phosphonic acid, cyclohexyl phosphonic acid, or 4-methylphenyl phosphonic acid; the partial esters of said acids, more particularly the $C_{1-20}$ alkyl, cycloalkyl, aryl or aralkyl esters, such as the methyl, ethyl, propyl, cyclohexyl, phenyl or benzyl esters; the partial metal salts of these acids, of which particularly the metals of the groups I and II of the periodic system, such as sodium, potassium, calcium or magnesium; and the partial ammonium salts of these acids. When use has been made of a salt of calcium, manganese and/or zinc as transesterification catalyst, care shouldbe taken that no antimony oxide is used as polycondensation catalyst. For in that case the salts can hardly, if at all, be deactivated before and/or during the transesterification reaction.

It is generally desirable that the phosphorus compound used for deactivation corresponds to at least 0,5 phosphorus atoms per metal atom of the transesterification catalyst. Favourable results are as a rule obtained when the amount of phosphorus compounds used for deactivation corresponds to 1 to 15 phosphorus atoms per metal atom, preference being given to using 1 to 5 phosphorus atoms per metal atom.

According to the present invention it is preferred that use should be made of polyesters and/or polyester amides prepared in the presence of a catalytic amount of a titanium catalyst. The advantages of a titanium catalyst is not only its high reactivity, but especially the ease with which it can be deactivated. Examples of suitable titanium catalysts include esters of titanium acid and the neutralized products thereof, hydrogenated hexa-alkoxy titanates of magnesium, titanyl oxalates, titanium halides, hydrolysed products of titanium halides, titanium hydroxide and titanium oxide hydrate and potassium titanium fluoride ($K_2TiF_6$). Preference is given to alkyl titanates such as tetramethyl titanate, tetraethyl titanate, tetrapropyl titanate or tetrabutyl titanate, the neutralized products thereof, the hydrogenated magnesium hexa-alkoxy titanates, such as hydrogenated magnesium hexabutoxy titanate Mg $(HTi[OC_4H_9]_6)_2$, titanyl oxalate, calcium titanyl oxalate, titanium tetrachloride, the reaction product of titanium tetrachloride and hexane diol and the reaction mixture of titanium tetrachloride and water. Said titanium catalysts are used alone or in combination with magnesium acetate or calcium acetate. Inorganic titanates such as lanthanum titanate, calcium acetate/antimony trioxide mixtures and lithium alkoxides and magnesium alkoxides are examples of other suitable catalysts. The amount in which they are to be incorporated generally ranges from 0.005 to 0.3% by weight, calculated on the components taking part in the reaction. For a man skilled in the art it will not be difficult to decide on the amount of catalyst to be used for a given system.

Many of the low-melting polyesters or polyester amides that may be used according to the invention are commercially available. Applicant has found that they contain no or hardly any transesterification promoting catalysts. There is therefore generally no need for these low-melting components to be deactivated. The high-melting components, however, are generally prepared in the presence of a transesterification promoting catalyst. When the deactivating compound is a phosphorus compound, the results obtained are generally satisfactory if the phosphorus compound is incorporated into the high-melting polyester prior to the reaction process and the mixture is kept in the molten state for at least 5 minutes. It has been found that satisfactory results are generally obtained when the high-melting polyester containing the phosphorus compound is in the molten phase for a period of 30 to 60 minutes.

The polyester-esters to be used according to the invention are usually prepared at a temperature ranging between the melting point of the highest-melting component and 290° C. An alternative procedure for obtaining a polyester-ester urethane according to the invention consists in thata bifunctional polyester having a molecular weight of at least 1000 and built up of ester units of the formula

wherein both G and $R_2$ have the same meaning as indicated before, is reacted, while in the molten phase, with a bifunctional polyester or polyester amide having a molecular weight of at least 1000 and a melting point not higher than 100° C., after which the resulting polyesterester is reacted with a low molecular weight coupling agent of the formula

wherein $R_1$ and p have the afore-indicated meaning, in an amount such that the ratio of the number of —NCO groups to the number of functional groups of the polyester-ester is at least 1,0 and not higher than 5.

Surprisingly, it has been found that under the above-mentioned process conditions when use is made of a mixture of a high-melting polyester and a low-melting polyester or polyester amide having an average hydroxyl number between 4 and 12, there is no longer any need for deactivation. The advantage of the last-mentioned process especially consists in that the amount of polyisocyanate to be used may be reduced to a minimum. Thus, when use is made of a polyester mixture having an average hydroxyl number of 4, the amount of diisocyanate calculated as MDI need only be as high as 1% by weight in the case of an NCO/OH ratio of 1,1. The length of time the high-melting and the low-melting polyester or polyester amide must react with each other to give an optimally transesterified block polyester-ester depends, in part, on the average hydroxyl number, the amount of transesterification catalyst and the composition of the polyesters used. A man skilled in the art will have no difficulty in choosing such conditions for a given reaction mixture as will lead to a polyester-ester urethane having optimum properties.

The invention will be further described in the following examples. They are, however, not to be construed as limiting the scope of the invention. For the determination of the properties of the polymers prepared in these examples use was made of the following methods:

The melting point $Tm_p$ in °C. was determined with a Du Pont Thermal Analyzer. The hardness in Shore D was determined in conformity with ASTM-D1484. The P.O.S. (=pull out strength) was determined by clamping a bundle of filament yarn (while under a tension of 10 g/dtex 1500) over a distance of 1 cm between two adhesive films 100μ thick, 3 cm long, 2 cm wide at a pressure of 500 g/cm² film surface area, and a temperature of 210° C. at a melting point of the films <200° C. or of 225° C. at a melting point of the films between 200° and 215° C. After having been conditioned for 24 hours at 23° C. and 50% RH (=relative humidity) the filament bundle was pulled out of the polymer films on an Instron tensile tester (of the 2211 type) at a crosshead speed of 50 mm per minute. The force required to this end is expressed in newton (N)/dtex 1000.

The surprisingly satisfactory mutual adhesion of the constituents forming the composite material is further clearly shown by the results obtained in the determination of the peel strength in accordance with ASTM D903. To this end use was made in the following examples of a fabric or paraphenylene terephthalamide (PPDT) yarn (dtex 1260) (construction: weft 11,2 threads/cm, warp 10,8 threads/cm) or a carbon yarn (dtex 2000) (construction: weft 5 threads/cm, warp 5 threads/cm).

The above fabrics were either laminated with a film of 200 μm of the composite material forming polyester urethane or, after impregnation with said last-mentioned material, laminated with a film of, respectively, polybutylene terephthalate (PBTP), polyethylene terephthalate (PETP), polyhexamethylene adipamide (nylon 6,6) or polyether imide. The peel strength is given in N/cm.

EXAMPLE I

63 Parts of molten PBTP (molecular weight 16000) were intensively mixed with 37 parts of polybutylene adipate PBA (molecular weight 1850) over a period of 60 minutes in a nitrogen atmosphere at 240° C./ To this transesterification product were subsequently added 3000 ppm diethylcarboxymethyl phosphonate (PEE). After 20 minutes stirring at 240° C. 6,8 parts of diphenylmethane-4,4'-diisocyanate (MDI) per 100 parts of polyester were mixed in, followed by stirring for 45 minutes at 240° C. On a bundle of 1000 filaments of polyparaphenylene terephthalamide (dtex 1680) the adhesion was determined by carrying out a P.O.S. test. The test results are given in the table below.

TABLE I

| Polymer | |
|---|---|
| weight ratio | |
| PBTP/PBA | 63/37 |
| $Tm_p$, °C. | 176 |
| hardness, Shore D | 55 |
| P.O.S. N/dtex 1000 | 28 |
| Peel strength (P.S.) for PPDT fabric on which there is provided a film of polymer laminated at 230° C. and | 21 |

TABLE I-continued

| Polymer | |
|---|---|
| 400 g/cm², N/cm | |

EXAMPLE II

The experiment of Example I was repeated, but in such a way that 73 parts of molten PBTP (molecular weight 16000) were intensively mixed with 27 parts of PBA (molecular weight 1850) over a period of 210 minutes at 240° C. After adding 3500 ppm of PEE mixing was continued for 20 minutes at 240° C. Subsequently, 5,5 parts of MDI per 100 parts of polyester were added and mixed for 45 minutes at 240° C.

In the P.O.S. test use was made of a similar bundle of filaments as in Example I. The test results are given in the table below.

TABLE II

| Polymer | |
|---|---|
| weight ratio | |
| PBTP/PBA | 73/27 |
| $Tm_p$, °C. | 179 |
| hardness, Shore D | 65 |
| P.O.S. N/dtex 1000 | 33 |
| P.S. for carbon yarn on which there is a polymer film laminated at 230° C. and 400 g/cm² | >22 |
| P.S. for PPDT fabric impregnated with polymer and laminated at 230° C. and 1000 g/cm², N/cm | 15,5 |

EXAMPLE III

A. Into 50 parts of PBTP (molecular weight 23000) there were introduced 450 ppm of PEE, followed by intensive mixing with 50 parts of PBA (molecular weight 1850) for 60 minutes at 240° C. Subsequently, 2000 ppm PEE were mixed in for 30 minutes at 240° C. Then 8.4 parts of MDI were added to the mixture over a period of 45 minutes at 240° C. After adding 1 part of Tinuvin®327, 1 part of Stabaxol® and 1 part of Irganox 1010® per 100 parts of polymer mixing was continued for 30 minutes at 240° C. The polymer properties and the adhesion of a corresponding bundle of filaments as indicated in Example I are given in the table below.

TABLE III

| Polymer | |
|---|---|
| weight ratio | |
| PBTP/PBA | 50/50 |
| $Tm_p$, °C. | 208 |
| hardness, Shore D | 47 |
| P.O.S. N/dtex 1000 | 33 |

When instead of a bundle of polyparaphenylene terephthalamide filaments a bundle of polyamide 6 filaments was taken (dtex 1100), then a P.O.S. of 27N/dtex 1000 was measured. Of a bundle of polyethylene terephthalate filaments (dtex 1100) the P.O.S. was found to be 23N/dtex 1000.

P.S. for carbon yarn fabric on which there is a polymer film laminated at 230° C. and 400 g/cm², N/cm>22

B. When in the preparation of the polymer of the composition given in Example IIIA a reaction time of 180 minutes was used, the resulting polymer displayed the following properties:

TABLE IV

| Polymer | |
|---|---|
| weight ratio | |
| PBTP/PBA | 50/50 |
| $Tm_p$, °C. | 165 |
| hardness, Shore D | 45 |
| P.O.S. with PPDT yarn, N/dtex 1000 | 30 |
| P.O.S. with nylon 6 yarn, N/dtex 1000 | 23 |
| P.O.S. with PETP yarn, N/dtex 1000 | 28 |
| P.S. for PPDT fabric on which there is a polymer film laminated at 230° C. and 400 g/cm², N/cm | 41,5 |

EXAMPLE IV

40 Parts of PBTP (molecular weight 16000) were subjected to deactivation with 1000 ppm of PEE. After 60 parts of PBA (molecular weight) 1850 had been added, stirring was continued for 120 minutes at 240° C. Subsequently, 3000 ppm of PEE were added, after which per 100 parts of polyester 0,8 parts of MDI were introduced into the mixture. After a reaction time of 45 minutes at 240° C. the following properties were measured:

TABLE V

| Polymer | |
|---|---|
| weight ratio | |
| PBTP/PBA | 40/60 |
| $Tm_p$, °C. | 200 |
| hardness, Shore D | 40 |
| P.O.S. with PPDT yarn in N/dtex 1000 | 33 |
| P.S. for PPDT fabric on which is a polymer film laminated at 230° C. and 400 g/cm², N/cm | 67,5 |

EXAMPLE V

37 Parts of PBTP (molecular weight 2000) and 63 parts of PBA (molecular weight 7500) were mixed for 60 minutes at 240° C. Subsequently, 4000 ppm of PEE were added and the mixture was stirred for 30 minutes at 240°. After adding 9 parts of MDI per 100 parts of polyester the mixture was stirred for another 30 minutes at 240° C.

The test results are given in the table below:

TABLE VI

| Polymer | |
|---|---|
| weight ratio | |
| PBTP/PBA | 37/63 |
| $Tm_p$, °C. | 164 |
| hardness, Shore D | 32 |
| P.O.S. with PPDT yarn in N/dtex 1000 | 27 |
| P.S. for PPDT fabric on which there is a polymer film laminated at 230° C. and 400 g/cm², N/cm | 32,5 |

EXAMPLE VI

20 Parts of PBTP (molecular weight 16000) into which there had been introduced 2000 ppm of PEE were mixed with 80 parts of PBA (molecular weight 1850) for 70 minutes at 240° C. After 2500 pm of PEE had been added to the reaction mixture, 12,5 parts of MDI per 100 parts of polyester were added and the mixture was stirred for another 60 minutes at 240° C. The following properties were measured:

TABLE VII

| Polymer | |
|---|---|
| weight ratio | |
| PBTP/PBA | 20/80 |
| $Tm_p$, °C. | 211 |
| hardness, Shore D | 38 |
| P.O.S. with PPDT yarn in N/dtex 1000 | 27 |
| P.O.S. with polyamide 6 yarn in N/dtex 1000 | 18 |
| P.O.S. with polyester (PETP) yarn, in N/dtex 1000 | 18 |
| P.S. for PPDT fabric on which there is a polymer film laminated at 230° C. and 400 g/cm², N/cm | 42,5 |

EXAMPLE VII

40 Parts of PBTP (molecular weight 16000) into which 1200 ppm of PEE had been introduced were mixed with 60 parts of polycaprolactone (PC) (molecular weight 2000) for 120 minutes at 240° C.

After adding 3500 ppm of PEE and heating for 30 minutes at 240° C. 8,9 parts of MDI per 100 parts of polyester were charged into the reaction mixture. After a reaction time of 45 minutes the following properties were measured:

TABLE VIII

| Polymer | |
|---|---|
| weight ratio | |
| PBTP/PC | 40/60 |
| $Tm_p$, °C. | 209 |
| hardness, shore D | 37 |
| P.O.S. with PPDT yarn in N/dtex 1000 | 21 |
| P.S. for PPDT fabric on which there is a polymer film laminated at 230° C. and 400 g/cm², N/cm | 47,5 |

EXAMPLE VIII 40 parts of PBTP (molecular weight 16000) were mixed, with stirring, with 625 ppm PEE for 30 minutes at 240° C. Subsequently, 60 parts of PBA (molecular weight 1850) were added and mixed at 240° C. for 150 minutes, after which still 1500 ppm PEE were introduced into the reaction mixture. Finally, 9,8 parts of hexamethylene diisocyanate (HDI) per 100 parts of polyester-ester were included in the mixture and heated for 45 minutes at 240° C. The following properties were measured:

TABLE IX

| Polymer | |
|---|---|
| weight/ratio | |
| PBTP/PBA | 40/60 |
| $Tm_p$, °C. | 201 |
| hardness, Shore D | 36 |
| melt flow index (MFI) at 220° C. | 10,3 |
| P.S. for PPDT fabric on which is a polymer film laminated at 230° C. and 400 g/cm², N/cm | 52,5 |
| P.S. for carbon yarn fabric on which is a polymer film laminated at 240° C. and 400 g/cm², N/cm | >19 |
| P.S. for PPDT fabric impregnated with polymer and on which there is a nylon 6,6 film laminated at 240° C. and 1000 g/cm², N/cm | 55 |
| P.S. for PPDT fabric impregnated with polymer and on which is a PETP film laminated at 220° C. and 1000 g/cm², N/cm | 43 |
| P.S. for PPDT fabric impregnated with polymer and on which there is a polyether imide film laminated at 230° C. and 1000 g/cm², N/cm | 29 |
| P.S. for carbon yarn fabric impregnated with polymer and on which there is a polyether imide film laminated at 230° C. and 1000 g/cm², N/cm | >20 |
| P.S. for PPDT fabric impregnated with polymer and on which there is a rubber film laminated at 200° C. and 1000 g/cm², N/cm | 10 |

EXAMPLE IX

To 40 parts of PBTP (molecular weight 16000) were added, with stirring, 1250 ppm PEE, for 30 minutes at 240° C. Then there were added to this mixture 60 parts of PBA (molecular weight 1850) and 1500 ppm of PEE for 150 minutes at 240° C. Subsequently, per 100 parts of polyesterester 11,6 parts of MDI were added and the mixture was stirred for 45 minutes at 240° C.

The following properties were measured:

TABLE X

| Polymer | |
|---|---|
| weight ratio | |
| PBTP/PBA | 40/60 |
| Tm$_p$, °C. | 222 |
| hardness, Shore D | 40 |
| MFI (220° C.) | 2,1 |
| P.S. for PPDT fabric impregnated with polymer and on which there is a PETP film laminated at 230° C. and 1000 g/cm², N/cm | 58 |

EXAMPLE X

The polymers were prepared as indicated in Example IX, except that the PBTP was deactivated with 625 ppm PEE instead of with 1250 ppm.

The following properties were measured:

TABLE XI

| Polymer | |
|---|---|
| weight ratio | |
| PBTP/PBA | 40/60 |
| Tm$_p$, °C. | 207 |
| hardness, Shore D | 31 |
| P.S. for PPDT fabric impregnated with polymer and on which there is a PBTP film laminated at 220° C. and 1000 g/cm, N/cm | >30 |
| P.S. for carbon yarns fabric impregnated with polymer and on which there is a PBTP film laminated at 220° C. and 1000 g/cm², N/cm | >24 |
| P.S. for carbon yarn fabric impregnated with polymer and on which there is a PETP film laminated at 220° C. and 1000 g/cm², N/cm | >23 |
| P.S. for carbon yarn fabric impregnated with polymer and on which there is a polyether imide film laminated at 230° C. and 1000 g/cm², N/cm | >20 |

I claim:

1. A comosite consisting of a thermoplastic or thermosetting polymer or a vulcanized or non-vulcanized rubber containing yarns, cords and/or fabrics provided with an adhesive, characterized in that the adhesive is a polyester-ester urethane built up of polyester-ester units which are linked together by low molecular weight structural units of the formula $$R_1[NHC\overset{O}{\overset{\|}{C}}]_p,$$

wherein $R_1$ represents a polyfunctional organic group having not more than 30 carbon atoms, and p is an integer of 2 or 3, which polyester units are composed of two types of polyester-ester units which are each built up of blocks comprising (1) a multiple of ester units of the formula $$-OGO\overset{O}{\overset{\|}{C}}R_2\overset{O}{\overset{\|}{C}}-, \text{ and}$$

(2) a multiple of other ester units which may form a bifunctional polyester or polyester amide having a melting point not higher than 100° C., which two types of polyester units are linked together by ester bonds, with the proviso that at least 80 mole % of the G groups in the latter formula are tetramethylene groups and the remaining proportion thereof consists of divalent groups left after removal of hydroxyl groups from a low molecular weight diol having a molecular weight not higher than 250; at least 80 mole % of the $R_2$ groups are 1,4-phenylene groups and the remaining proportion thereof consists of divalent radicals left after removal of carboxyl groups from a low molecular weight dicarboxylic acid having a molecular weight not higher than 300; the sum of the percentages of G groups which are not tetramethylene groups and the percentages of $R_2$ groups which are not 1,4-phenylene groups does not exceed 20; the ester units of the formula $$-OGO\overset{O}{\overset{\|}{C}}R_2\overset{O}{\overset{\|}{C}}-$$

form 30 to 80% by weight of the polyester-ester, and that blocks of ester units of the formula $$-OGO\overset{O}{\overset{\|}{C}}R_2\overset{O}{\overset{\|}{C}}-$$

and the blocks of the other ester units are present in amounts such that the melting point of the polyester-ester urethane is at least 160° C.

2. A composite according to claim 1, characterized in that the ester units of the formula $$-OGO\overset{O}{\overset{\|}{C}}R_2\overset{O}{\overset{\|}{C}}-$$

are butylene terephthalate units.

3. A composite according to claim 1, characterized in that the ester units that may form a bifunctional polyester or polyester amide having a melting point not higher than 100° C. are entirely or substantially derived from polybutylene adipate.

4. A composite according to claim 1, characterized in that the ester units that may form a bifunctional polyester or polyester amide having a melting point not higher than 100° C. are entirely or substantially derived from polycaprolactone.

5. A composite according to claim 1, characterized in that the proportion of the low molecular weight structural units of the formula $$R_1[NHC\overset{O}{\overset{\|}{C}}]_p$$

calculated as diphenylmethane-4,4'-diisocyanate (MDI) and based on the polyester-ester urethane is in the range of 0,5 to 12,5 percent by weight.

6. A composite according to claim 5, characterized in that the proportion of the low molecular weight structural units of the formula $$R_1[NHC\overset{O}{\overset{\|}{C}}]_p$$

is in the range of 1 to 10 percent by weight.

* * * * *